(12) United States Patent
Kindl et al.

(10) Patent No.: US 11,014,497 B2
(45) Date of Patent: May 25, 2021

(54) COMPONENT FOR A VEHICLE

(71) Applicant: WEIDPLAS GmbH, Rüti (CH)

(72) Inventors: Christoph Kindl, St. Ingbert (DE); Peter Zweifel, Siebnen (CH); Steffen Reuter, Uerikon (CH); Jan-Eric Frijters, Oberiberg (CH); Norbert Quien, St. Ingbert (DE)

(73) Assignee: WEIDPLAS GMBH, Küsnacht (CH)

( * ) Notice: Subject to any disclaimer, the term of this patent is extended or adjusted under 35 U.S.C. 154(b) by 0 days.

(21) Appl. No.: 16/629,336

(22) PCT Filed: May 17, 2018

(86) PCT No.: PCT/EP2018/062870
§ 371 (c)(1),
(2) Date: Jan. 8, 2020

(87) PCT Pub. No.: WO2019/015829
PCT Pub. Date: Jan. 24, 2019

(65) Prior Publication Data
US 2020/0391657 A1    Dec. 17, 2020

(30) Foreign Application Priority Data
Jul. 21, 2017   (EP) .................................... 17182616

(51) Int. Cl.
*B60Q 3/64*      (2017.01)
*B60Q 3/78*      (2017.01)
*B60Q 3/217*     (2017.01)

(52) U.S. Cl.
CPC ............... *B60Q 3/64* (2017.02); *B60Q 3/217* (2017.02); *B60Q 3/78* (2017.02)

(58) Field of Classification Search
CPC ... B60Q 3/62; B60Q 3/64; B60Q 3/78; B60Q 3/217
See application file for complete search history.

(56) References Cited

U.S. PATENT DOCUMENTS 2,886,911 A    5/1959   Hardesty
5,975,711 A    11/1999  Parker et al.
(Continued)

FOREIGN PATENT DOCUMENTS

DE    299 15 399 U1    12/1999
DE    299 17 623 U1    12/1999
(Continued)

OTHER PUBLICATIONS

International Search Report of PCT/EP2018/062870 dated Jul. 10, 2018 [PCT/ISA/210].
(Continued)

*Primary Examiner* — Mariceli Santiago
(74) *Attorney, Agent, or Firm* — Sughrue Mion, PLLC (57) ABSTRACT

A component (1) for a vehicle having a visible side (11) comprises a first light guide (2), which comprises a light coupling-in surface (25) and a plurality of first light deflection elements (211, 212, 213, 214, 215), wherein light can be coupled into the first light guide (2) through the light coupling-in surface (25), and a plurality of diffuser elements (311, 312, 313, 314, 315) which are designed to scatter light diffusely. The first light deflection elements (211, 212, 213, 214, 215) are each designed to deflect the light coupled into the first light guide (2) by a deflection angle directed in the direction of the diffuser elements (311, 312, 313, 314, 315) so that the diffuser elements (311, 312, 313, 314, 315) scatter said directed light diffusely in the direction of the visible side (11).

24 Claims, 6 Drawing Sheets

(56) References Cited

U.S. PATENT DOCUMENTS

| | | | |
|---|---|---|---|
| 6,728,464 | B1 | 4/2004 | Waldmann |
| 2003/0007344 | A1 | 1/2003 | Parker |
| 2008/0037284 | A1 | 2/2008 | Rudisill |
| 2008/0129925 | A1 | 6/2008 | Han et al. |
| 2011/0116286 | A1 | 5/2011 | Rudek et al. |
| 2012/0224382 | A1 | 9/2012 | Petersohn et al. |
| 2013/0121024 | A1 | 5/2013 | Barth et al. |
| 2015/0307033 | A1 | 10/2015 | Preisler et al. |
| 2019/0107661 | A1 | 4/2019 | Kindl et al. |

FOREIGN PATENT DOCUMENTS

| | | |
|---|---|---|
| DE | 100 16 714 A1 | 10/2001 |
| DE | 20 2004 008 681 U1 | 8/2004 |
| DE | 10 2009 051 534 A1 | 5/2011 |
| DE | 10 2011 122 615 A1 | 6/2013 |
| DE | 20 2014 100 942 U1 | 3/2014 |
| DE | 10 2014 216 780 A1 | 3/2015 |
| EP | 1 327 558 A2 | 7/2003 |
| EP | 2 317 214 A1 | 5/2011 |
| EP | 2 322 962 A1 | 5/2011 |
| EP | 2 363 738 A2 | 9/2011 |
| EP | 2 524 841 A2 | 11/2012 |
| EP | 2 530 372 A1 | 12/2012 |
| EP | 2 660 803 A1 | 11/2013 |
| EP | 2 684 744 A1 | 1/2014 |
| EP | 2 853 806 A1 | 4/2015 |
| EP | 2 954 509 A1 | 12/2015 |
| EP | 3 228 931 A1 | 10/2017 |
| EP | 3 326 863 A1 | 5/2018 |
| FR | 2 937 603 A1 | 4/2010 |
| GB | 2475940 A | 6/2011 |
| JP | 2006-160136 A | 6/2006 |
| KR | 10-2008-0046313 A | 5/2008 |
| KR | 10-2010-0048981 A | 5/2010 |
| KR | 10-2014-0078371 A | 6/2014 |
| WO | 2010/118795 A1 | 10/2010 |
| WO | 2013/028460 A1 | 2/2013 |
| WO | 2014/033686 A2 | 3/2014 |
| WO | 2014/122078 A1 | 8/2014 |
| WO | 2015/116743 A1 | 8/2015 |

OTHER PUBLICATIONS

International Preliminary Report on Patentability with translation of Written Opinion dated Jan. 21, 2020, in International Application No. PCT/EP2018/062870.

COMPONENT FOR A VEHICLE

CROSS REFERENCE TO RELATED APPLICATIONS

This application is a National Stage of International Application No. PCT/EP2018/062870, filed May 17, 2018, claiming priority to European Patent Application No. 17 182 616.7, filed Jul. 21, 2017.

TECHNICAL FIELD

The present invention relates to a component for a vehicle, in particular an illuminable component.

PRIOR ART

In vehicles, and particularly motor vehicles, for example automobiles or aircrafts, a very wide variety of illuminable components are provided. For instance, illuminable components may be provided for decoration purposes, these decorating the surface of objects and rendering them original, individual and optionally so as to promote sales. The illumination may, for example, be used for visually upgrading the vehicle. The components may, however, also be configured to be illuminable in order to improve the visual perception of the components, particularly at night. Illuminable components are provided for example in the region of the doors and the luggage compartment lid, in order to mark the height of a foot strip and/or to represent a brand name. Illuminable components may, however, also be provided in the form of actuation elements, for example buttons, in order to improve the visibility of the buttons.

For instance, a trim part for a motor vehicle is known from US 2015/0307033 A1, which comprises a polymer substrate, a decorative layer arranged over the substrate, and a protective layer protecting this decorative layer. The protective layer is a transparent or translucent layer having a surface finish. The effect of the surface finish is that light passing through the protective layer is scattered out diffusely Furthermore, a component is known from EP 2 853 806 A1, with a light guide that has light deviating elements. Light of a light source is deviated in the light guide by the light deviating elements and is output from the light guide. The light deviating elements are in this case configured and arranged in such a way that they are scarcely visible to a human eye in an unilluminated state of the light guide.

Diffusely scattering light deviating elements have the disadvantage that they forward the light inside the light guide only poorly and a multiplicity of light sources therefore generally need to be used for illuminating the component. Furthermore, such diffusely scattering light deviating elements lead to a turbid, milky appearance of the component in the unilluminated state, which is often not desired for artistic reasons.

For example, EP 1 327 558 A2 discloses a vehicle lamp that has a plurality of light-emitting diodes, which are respectively assigned to a prismatic element. The prismatic elements emit the light of the light-emitting diodes in a very wide variety of directions.

The provision of a plurality of light sources in a component has, however, the disadvantage that the production of such a component is associated with great outlay and, in particular, also with high costs.

SUMMARY OF THE INVENTION

It is therefore an object of the present invention to provide an illuminable component for a vehicle, which, with a simple structure, has good illumination.

In order to achieve this object, a component for a vehicle, having a visible side, is provided, which comprises a first light guide and a plurality of diffuser elements. The first light guide comprises a light introduction surface and a plurality of first light deviating elements, light being introducible into the first light guide through the light introduction surface. The plurality of diffuser elements, which are preferably arranged outside the first light guide, are configured to scatter light diffusely. The first light deviating elements are respectively configured to directionally deviate light introduced into the first light guide by a deviation angle in the direction of the diffuser elements, so that the diffuser elements scatter this directional light diffusely in the direction of the visible side of the component.

The light introduced through the light introduction surface is therefore guided inside the first light guide to the plurality of first light deviating elements, by which it is then deviated in the direction of the diffuser elements. The light deviated by the first light deviating elements is then scattered diffusely by the diffuser elements in the direction of the visible side of the component. Because of the first light deviating elements, the use of only a few light sources is possible, which may furthermore be positioned in an arbitrary arrangement relative to the first light guide. The diffuser elements preferably lead to uniform illumination of the desired regions of the visible side of the component.

Preferably, the first light guide is in one piece overall and particularly preferably produced by the injection molding method. In certain embodiments, however, it may also be configured in several pieces.

The first light deviating elements preferably respectively comprise at least one planar impingement surface, which extends inclined with respect to a main propagation direction of the light introduced into the light guide, and which the light introduced into the first light guide strikes. Preferably, this impingement surface is respectively configured to be quadrangular. Depending on the inclination of the impingement surface, the light is deviated at the impingement surface by a particular deviation angle. This deviation angle, or the inclination of the impingement surface, is preferably selected in such a way that the deviated light preferably strikes the diffuser elements directly. The deviation of the light at the first light deviating elements is preferably physically based on different refractive indices of the materials in the region of the first light deviating elements, in particular the material of the first light guide, on the one hand, and air or another gaseous material on the other hand.

Preferably, the first light deviating elements respectively comprise a three-dimensional structure, which is formed only by a plurality of planar surfaces. Preferably, two of these surfaces are arranged opposite one another and configured trapezoidally. Furthermore, two of the surfaces, which are arranged opposite one another but extend inclined with respect to one another, are preferably configured rectangularly. At least one or precisely one of the aforementioned surfaces respectively forms the impingement surface of the respective first light deviating element for the light. In relation to the first light deviating elements, however, any desired structures are possible so long as these structures are suitable for respectively deviating the light in the direction of the diffuser elements.

The diffuser elements are advantageously structures which respectively comprise a plurality of planar or curved scattering surfaces, so that incident light is scattered at these scattering surfaces. The scattering of the light at the scattering surfaces is preferably physically based on the different refractive indices of the materials in the region of the diffuser elements. Advantageously, the diffuser elements respectively form interfaces between two different materials, so that correspondingly the aforementioned different refractive indices are brought about. Preferably, at least one of these materials is air or another gaseous material.

The diffuser elements may, in particular, be configured as polyhedra, preferably with four or more scattering surfaces. Preferably, the diffuser elements are respectively configured as a frustopyramid, the lateral surface of which is advantageously formed by at least six, more advantageously by at least eight side surfaces. It is, however, also possible to provide the diffuser elements such that they have one or more curved surfaces, in order to scatter the light diffusely at the curved surfaces. The diffuser elements may, in particular, respectively also be formed hemispherically.

Because of the specific configuration and arrangement of the first light deviating elements, precise and accurately defined light deviation in the direction of the diffuser elements is therefore induced. The light introduced into the first light guide may propagate in a deliberate way by means of the first light deviating elements through the first light guide, so that a large majority of the introduced light can reach the diffuser elements and be used for illuminating the component. The light loss in the component may thereby be minimized. Furthermore, the need to provide a multiplicity of light sources for the illumination of the component is thereby obviated. Furthermore, this specific configuration and arrangement of the first light deviating elements allow asymmetrical light introduction, only a small number of light sources being required on one side.

The first light deviating elements are preferably arranged in one or more first light deviating groups in such a way that the first light deviating elements respectively deviate the light introduced into the first light guide directionally by the same deviation angle inside each of the first light deviating groups.

All the first light deviating elements of a common first light deviating group may respectively be arranged in a common plane which extends, in particular, substantially parallel in relation to a main propagation direction of the introduced light in the first light guide.

A plurality of first light deviating groups may be provided, wherein the first light deviating elements of different first light deviating groups directionally deviate the light introduced into the first light guide by a respectively different deviation angle. Preferably, the plurality of first light deviating groups are all arranged in the same common plane.

The diffuser elements may be arranged in one or more diffuser element groups, wherein, in particular, all the diffuser elements of a common diffuser element group are respectively arranged in a common plane.

According to one refinement of the invention, each of the diffuser element groups is respectively assigned one of the first light deviating groups, so that the light introduced into the first light guide is deviated by each of the first light deviating groups respectively in the direction of one of the diffuser element groups.

This interplay or interaction of the first light deviating elements with their advantageously respectively assigned diffuser elements likewise contributes to the light propagating in a deliberate and controlled way through the component.

If a plurality of diffuser element groups are provided, each having diffuser elements arranged in a common plane, the various diffuser element groups may respectively extend in mutually inclined planes.

By the diffuser elements or the diffuser element groups being provided in mutually inclined planes, the component may be configured with a curvature at least in the region of these elements, or respectively groups. In other words, this arrangement makes it possible to illuminate a curved surface of the component. With the aid of this arrangement, a curved surface of the component may therefore be illuminated uniformly with few, preferably even with only a single light source. In particular, by this arrangement the visible side of the component may be illuminated uniformly if the visible side of the component is configured to be curved overall.

According to one refinement of the invention, the first light guide may furthermore comprise a plurality of second light deviating elements, which are respectively configured to directionally deviate the light introduced into the first light guide in the direction of the first light deviating elements. A light beam introduced into the first light guide is then thus deviated two times on its way to the diffuser elements because of the first and second light deviating elements. In this way, large deviation angles, in particular of more than 90°, may be achieved overall.

In a similar way to the first light deviating elements, the second light deviating elements preferably respectively also comprise at least one planar surface, which extends inclined with respect to the main propagation direction of the light introduced into the first light guide, and which the light introduced into the first light guide strikes. Depending on the inclination of this surface, the light at this surface is deviated at a particular deviation angle. This deviation angle, or the inclination of the surface, is preferably selected in such a way that the light deviated by the second light deviating elements directionally strikes at least some of the first light deviating elements.

The second light deviating elements may, in particular, be arranged in one or more second light deviating groups in such a way that the second light deviating elements directionally deviate the light introduced into the first light guide respectively by the same deviation angle inside each of the second light deviating groups.

All the second light deviating elements of a common second light deviating group are respectively preferably arranged in a common plane which extends, in particular, substantially parallel in relation to a main propagation direction of the introduced light in the first light guide.

A plurality of second light deviating groups may be provided, the second light deviating elements of different second light deviating groups directionally deviating the light introduced into the first light guide by a respectively different deviation angle.

Each of the first light deviating groups may respectively be assigned one of the second light deviating groups, so that the light introduced into the first light guide is deviated by each of the second light deviating groups respectively in the direction of one of the first light deviating groups. In such an assignment of the first and the second light deviating groups, each of the second light deviating groups is preferably respectively assigned one diffuser element group, so that the introduced light respectively travels from each of the second light deviating groups via one of the first light deviating groups to one of the diffuser element groups. Twofold deviation therefore takes place.

In one particularly preferred embodiment, the component furthermore comprises a second light guide, which comprises the diffuser elements. The second light guide may be arranged directly next to the first light guide in the component, although it is preferably arranged at a distance from the first light guide.

Preferably, the first and second light deviating elements are arranged in the first light guide and the diffuser elements are arranged in the second light guide. The second light guide may be configured in one piece or several pieces. A second light guide configured in several pieces is advantageous in particular when a curved surface of the component is intended to be illuminated. In this case, the individual sections or segments of the second light guide may be inclined with respect to one another in such a way that they follow the curvature of the surface to be illuminated. A second light guide configured in several pieces may therefore be adapted flexibly to a surface to be illuminated and consequently allows full illumination of components with a very wide variety of geometries. In particular, such illumination makes it possible that the illuminated component can be seen well from all spatial directions above the visible side of the component. A second light guide configured in one piece may, for example, be configured as a flexible foil, or produced from a material which imparts flexibility to the second light guide. This material is for example an elastomer, for example silicone rubber. By means of such flexible second light guides configured in one piece, the component may be produced simply and surfaces, in particular curved surfaces, of the component, in particular the visible side of the component, may be illuminated optimally.

On the other hand, however, it is likewise possible to provide the diffuser elements together with the first light deviating elements and the second light deviating elements, if present, in the first light guide. For example, the first and optionally the second light deviating elements may be arranged inside the first light guide and/or in the region of a lower surface of the first light guide, and the diffuser elements may be arranged on a surface of the first light guide opposite the lower surface. Such a configuration has a simplified structure in comparison with a component having a plurality of light guides.

The component may furthermore comprise a structure, in particular a carrier structure, arranged between the first light guide and the second light guide, having at least one channel for delimiting the directionally deviated light between the first light guide and the second light guide. The at least one channel may be laterally delimited by structure walls which are configured preferably to be light-reflecting or light-absorbing.

Preferably, as many channels are provided as it has diffuser element groups. Advantageously, each pair of respectively one diffuser element group and one first light deviating group is respectively assigned one channel. If the second light guide has a curvature or a plurality of segments arranged mutually inclined, the structure walls may extend between the first light guide and the second light guide in directions mutually inclined differently according to this curvature, or according to the extent directions of the segments. This means that the structure walls are then preferably respectively configured and arranged in such a way that they do not impede the propagation of the directionally deviated light between the first light guide and the second light guide, but instead provide for channeling this light. Furthermore, there is an advantage due to the channeling of the light in that, by the assignment of a respective first light deviating group to a diffuser element group, extraneous or leakage light is prevented from being able to enter the optical arrangement and therefore leading to undesired scattered light effects.

Light-absorbing structure walls may comprise a coating of a light-absorbing material or be entirely formed from a light-absorbing material. Similarly, light-reflecting structure walls may comprise a coating of a light-reflecting material or be entirely formed from a reflective material. For example, black plastic may be used as a light-absorbing material. Light-absorbing structure walls offer the advantage that unintended scattered radiation, which propagates nondirectionally through the first light guide or is emitted nondirectionally into the second light guide, is absorbed by the light-absorbing structure walls. In this way, illumination of the component in regions where this is not intended is avoided. One example of a light-reflecting material is a specular white plastic.

Light-reflecting structure walls offer the advantage that scattered radiation which strikes the structure walls is scattered back thereby and, in a similar way to laser radiation in a glass fiber, is reflected in the direction of the visible side through the channels. In this way, light losses are substantially avoided and a high optical efficiency is achieved.

In order to achieve a high luminance, or good illumination on the visible side, a number of light deviating elements and/or diffuser elements which is as high as possible is advantageous. At the same time, however, there is an unesthetic effect if these elements are visible in the unilluminated state, i.e. when no light is introduced into the first light guide, to a human eye, preferably at a conventional distance of about 30 cm to 70 cm from the visible side of the component.

In order to achieve a high luminance, the dimensioning and arrangement of the first light deviating elements are preferably selected as follows: if a respective first light deviating element has a circle as a cross section with a midpoint, or a circumcircle with a midpoint can be drawn around the cross section of a respective first light deviating element, the midpoint of the circle or of the circumcircle of a respective first light deviating element has a distance from the midpoint of the circle or of the circumcircle of all other first light deviating elements, which is less than the diameter of the circle or of the circumcircle of the respective first light deviating element divided by the value 0.33. Preferably, the respective first light deviating element and all other first light deviating elements belong to a respective common first light deviating group, all the first light deviating elements of the respective common first light deviating group preferably being arranged in a common plane. The diameter of the circle or of the circumcircle is preferably at most 50 micrometers. These dimensions and such an arrangement lead to a high density of first light deviating elements, which are therefore arranged close to one another in the first light guide and lead to efficient deviation of the introduced light to the diffuser elements. The same relationships may also be applied to the second light deviating elements, so that these are also provided with a high density in the first light guide.

In order to satisfy any requirements for the esthetics of the component in the unilluminated state, a respective diffuser element may have a circle as a cross section with a midpoint, or a circumcircle with a midpoint can be drawn around the cross section of a respective diffuser element, the midpoint of the circle or of the circumcircle of a respective diffuser element preferably having a distance from the midpoint of the circle or of the circumcircle of all other diffuser elements, which is greater than the diameter of the circle or of the circumcircle of the respective diffuser element divided by the value 0.33. Preferably, the respective diffuser element and all other diffuser elements belong to a respective common diffuser element group, all the diffuser elements of the respective common diffuser element group preferably being arranged in a common plane. The diameter of the circle or of the circumcircle is preferably at most 50 micrometers.

The combination of these dimensions, such an arrangement and the use of geometrical elements (for example elevations and/or depressions) as diffuser elements leads to the diffuser elements being scarcely visible to a human eye in the unilluminated state, i.e. when no light is introduced into the first light guide. In particular, the combination of the dimensions, the arrangement and the configuration of the diffuser elements as geometrical elements makes it possible that the diffuser elements can be arranged in a light guide produced from an in particular glass-clear material or transparent material, for example a glass-clear plastic, without the light guide then having a turbid, milky appearance in the unilluminated state.

The component may furthermore comprise at least one light source, preferably precisely one light source, for introducing the light into the first light guide.

Preferably, the visible side of the component is formed at least partially by a decorative element. The visible side of the component may, in particular, be configured to be curved. In particular, the visible side of the component may be configured to be curved overall. Likewise, the visible side of the decorative element may be configured to be curved, in particular curved overall. If the component has a second light guide, which comprises the diffuser elements, the decorative element is preferably arranged bearing on the second light guide. The decorative element is preferably produced from metal, plastic or wood. If the decorative element is configured to be opaque, or nontransparent, the decorative element comprises at least one opening through which the light can shine. If the decorative element comprises a plurality of openings, these may define surfaces inclined differently with respect to one another according to the curvature of the visible side of the decorative element. If a second light guide is provided, which comprises the diffuser elements, it advantageously engages in the openings of the decorative element. Preferably, the second light guide engages in the openings of the decorative element in such a way that the surface of the second light guide lies flush with the surface of the decorative element in the region of the openings. Dirt accumulations along the edges of the openings may thereby be avoided.

In one preferred embodiment, the component is configured as a trim strip, in particular as a door sill panel. Preferably, the trim strip, in particular the door sill panel, is configured for visual communication with the passengers and/or persons outside the vehicle, for example for warning and/or to display defined states.

In another likewise preferred embodiment, the component is configured as a bumper or as a part of a bumper.

In yet another preferred embodiment, the component is configured as an actuation element, for example a button.

The present invention also provides a vehicle, in particular a motor vehicle, which comprises the component according to the invention, which is configured as described.

Preferably, the component is arranged in an interior region and/or in an exterior region of the vehicle.

Because of the first and, if provided, second light deviating elements as well as the diffuser elements, very efficient and bright illumination of the component can be achieved with only few light sources, possibly even with only a single light source. In this way, the structure of the component is simplified and it is possible to save on production costs.

BRIEF DESCRIPTION OF THE DRAWINGS

Preferred embodiments of the invention will be described below with the aid of the drawings, which serve merely for explanation and are not to be interpreted as restrictive. In the drawings.

DESCRIPTION OF PREFERRED EMBODIMENTS

Figure 1:
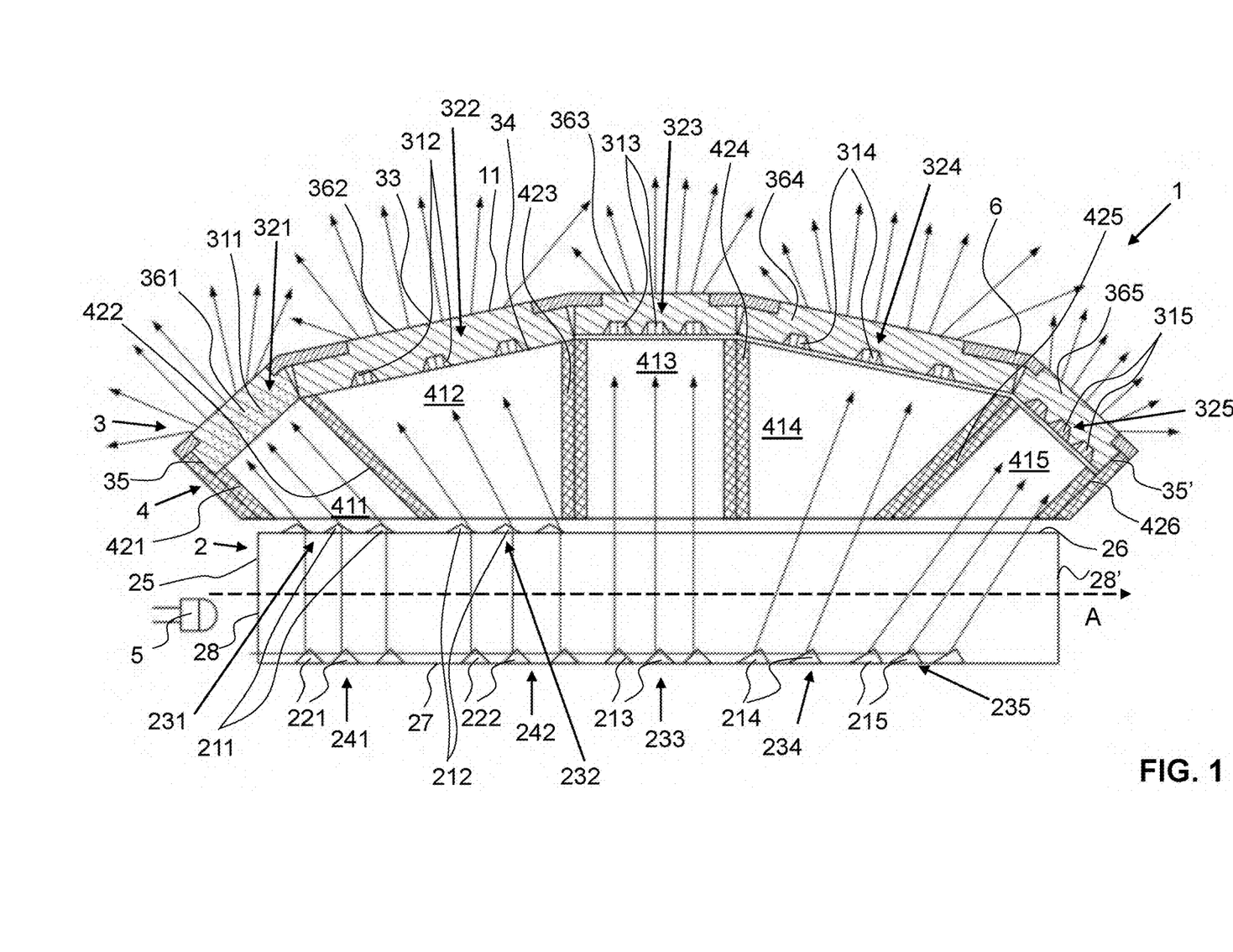
FIG. 1 schematically shows a central longitudinal section through a component according to the invention having first and second light deviating elements in a first light guide and having diffuser elements in a second light guide.

FIG. 1 represents a component 1 according to the invention in a central longitudinal section. The component 1 is an illuminated component for a vehicle, in particular a bumper or a part of a bumper. In similar or alternative embodiments, however, the component 1 may also be a foot strip or door sill plate for a vehicle. The configuration of the component 1 as an actuation element, such as a button, of a vehicle is also possible. Likewise possible, for example, is the configuration of the component 1 as a trim strip for visual communication with vehicle passengers and/or persons outside the vehicle, for example for warning and/or to display defined states.

As can be seen from FIG. 1, the component 1 is provided with a visible side 11 and comprises a first light guide 2, a second light guide 3, a structure 4 and a light source 5, which will respectively be discussed in more detail below.

The first light guide 2 is a substantially cuboid body which comprises a surface 26, a lower surface 27 and four side surfaces (only the side surfaces 28, 28' can be seen in FIG. 1). The side surface 28 forms a light introduction surface 25. The first light guide 2 as a whole is produced in one piece from a transparent or at least translucent material such as plastic or glass. The plastic is for example a thermoplastic, a thermoset or an elastomer. The elastomer is, for example, a silicone rubber. In the region of its surface and lower surface 26, 27, the first light guide 2 comprises a plurality of first light deviating elements 211, 212, 213, 214, 215 and a plurality of second light deviating elements 221, 222.

The second light guide 3 is arranged at a distance from the first light guide 2 in the component 1 and is formed from a transparent or at least translucent material, in particular a plastic or glass. In the case of plastic, this may for example involve one or more cuboid plastic elements or one or more plastic foils. The plastic is for example a thermoplastic, a thermoset or an elastomer. In the case of an elastomer, it is for example possible to use silicone rubber. The second light guide 3 comprises an upper side 33, a lower side 34 and outer sides 35, 35'. In the exemplary embodiment shown in FIG. 1, the second light guide 3 is configured in several pieces and subdivided into a plurality of light guide sections 361, 362, 363, 364, 365. The light guide sections 361, 362, 363, 364, 365 are in this case arranged inclined with respect to one another.

The second light guide 3 comprises diffuser elements 311, 312, 313, 314, 315, which are configured to diffusely scatter light towards the upper side 33. The upper side 33 forms a part of the visible side 11 of the component 1.

Through the light introduction surface 25, light of the light source 5 can be introduced along a main propagation direction A into the first light guide 2. The first light deviating elements 211, 212, 213, 214, 215 are respectively configured to directional deviate the light introduced into the first light guide 2 by a deviation angle in the direction of the diffuser elements 311, 312, 313, 314, 315 arranged in the second light guide 3, so that the deviated light strikes the diffuser elements 311, 312, 313, 314, 315 directly. The diffuser elements 311, 312, 313, 314, 315 then scatter the light diffusely in the direction of the visible side 11, so that uniform illumination of the part of the visible side 11 formed by the second light guide 3 is achieved.

The second light deviating elements 221, 222 are respectively configured to directionally deviate light introduced into the first light guide 2 in the direction of the first light deviating elements 211, 212, so that the deviated light strikes the first light deviating elements 211, 212 directly. Provision of the second light deviating elements 221, 222 is necessary in order to be able to achieve a high luminous efficiency even at those positions of the component 1 where the light introduced into the first light guide 2 needs to be deviated by more than 90° in order to reach the corresponding diffuser elements 311, 312.

Figure 2:
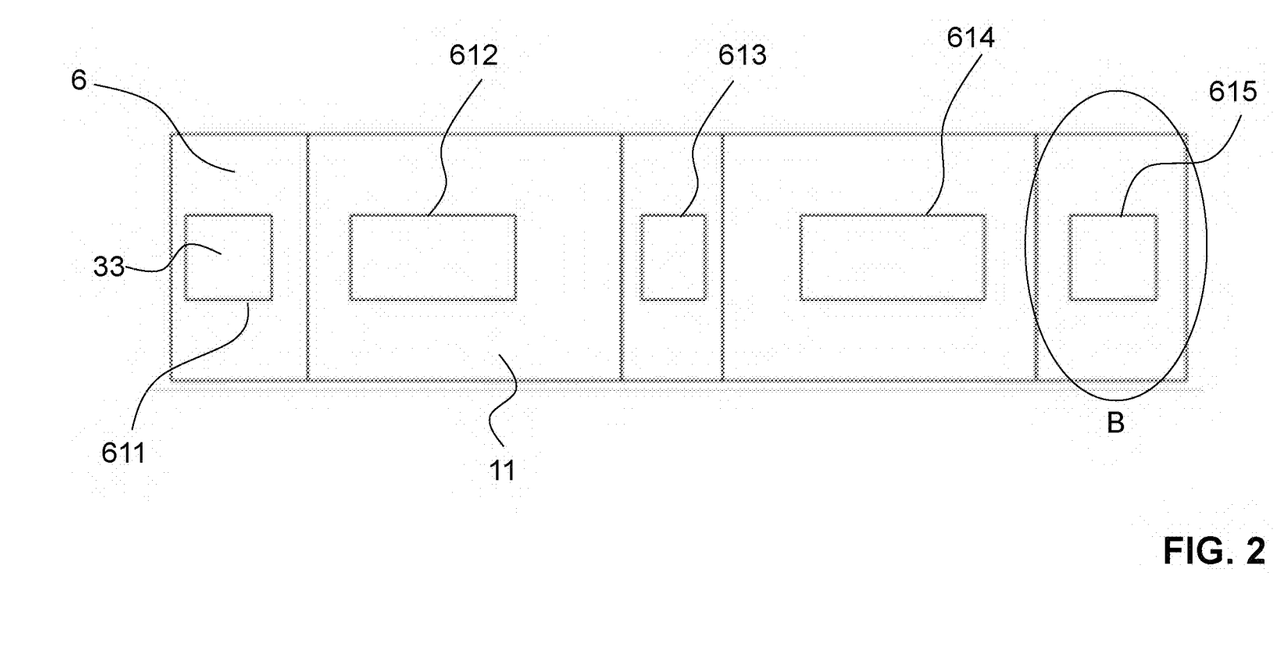
FIG. 2 shows a plan view of the component according to FIG. 1.

Fastened on the upper side 33 of the second light guide 3, there is a decorative element 6, which can be seen well particularly in FIG. 2. The decorative element 6 is configured to be curved at a plurality of positions, in order to bear substantially on the entire upper side 33 of the second light guide 3 according to the orientation of the light guide sections 361, 362, 363, 364, 365. The decorative element 6 is in this case produced as a whole in one piece from an opaque material, for example a metal, wood or a plastic. As may be seen in FIG. 1, the visible side 11 of the component 1 is configured to be curved overall.

In the regions where lighting of the component 1 is desired, the decorative element 6 comprises corresponding openings 611, 612, 613, 614, 615, which enable viewing of the second light guide 3 illuminated via the first light guide 2. The second light guide 3 engages in the openings 611, 612, 613, 614, 615 in each case in such a way that the surface of the second light guide 3 lies flush in the region of the openings 611, 612, 613, 614, 615 with the surface of the decorative element 6 which forms the visible side 11. In the exemplary embodiment according to FIGS. 1 and 2, the decorative element 6 comprises five openings 611, 612, 613, 614, 615, one of which is respectively arranged in each of the five light guide sections 361, 362, 363, 364, 365 and enables viewing in each case of the upper side 33 of the second light guide 3 there. By light from the light source 5 then being introduced into the first light guide 2 and striking the diffuser elements 311, 312, 313, 314, 315 of the second light guide 3 via the second light deviating elements 221, 222 and the first light deviating elements 211, 212, 213, 214, 215, the light is emitted diffusely through the openings 611, 612, 613, 614, 615 into the surroundings. Because of the effect of the diffuser elements 311, 312, 313, 314, 315, the openings 611, 612, 613, 614, 615 are in this case illuminated uniformly.

In the present exemplary embodiment, the component 1 thus comprises precisely one light source 5. Because of the specific configuration and mutual arrangement of the first and second light deviating elements 211, 212, 213, 214, 215 and 221, 221, on the one hand, and the diffuser elements 311, 312, 313, 314, 315 on the other hand, uniform and full illumination of all the openings 611, 612, 613, 614, 615 of the decorative element 6 can nevertheless be achieved. Notwithstanding, it is naturally possible to provide two or more light sources.

The diffuser elements 311 are for example particles, gas inclusions and/or local material modifications, which are arranged inside the second light guide 3. The diffuser elements 311 may, for example, be produced by means of a laser. The light striking the diffuser elements 311 is scattered and forwarded in a multiplicity of different directions.

The diffuser elements 312, 313, 314, 315 are structures which are respectively provided in the form of local depressions in the lower side 34 of the second light guide 3. As an alternative or in addition, it would also be possible to provide correspondingly configured diffuser elements in the form of local elevations in the upper side 33 of the second light guide 3. The light scattering is in this case caused by the abrupt change in the refractive index at the transition from air or another gaseous material to the material of the second light guide 3, or vice versa. Since the diffuser elements 312, 313, 314, 315 respectively comprise a multiplicity of planar delimiting surfaces, inclined in different directions, between air (or another gaseous material) and the material of the second light guide 3, the light striking the diffuser elements 312, 313, 314, 315 is respectively forwarded according to a multiplicity of different directions, and therefore scattered. In order to achieve even more efficient scattering, the delimiting surfaces formed by the diffuser elements 312, 313, 314, 315 may also be configured to be curved. The diffuser elements 312, 313, 314, 315 may respectively even only comprise a single curved delimiting surface, which may for example be hemispherical.

Figure 4:
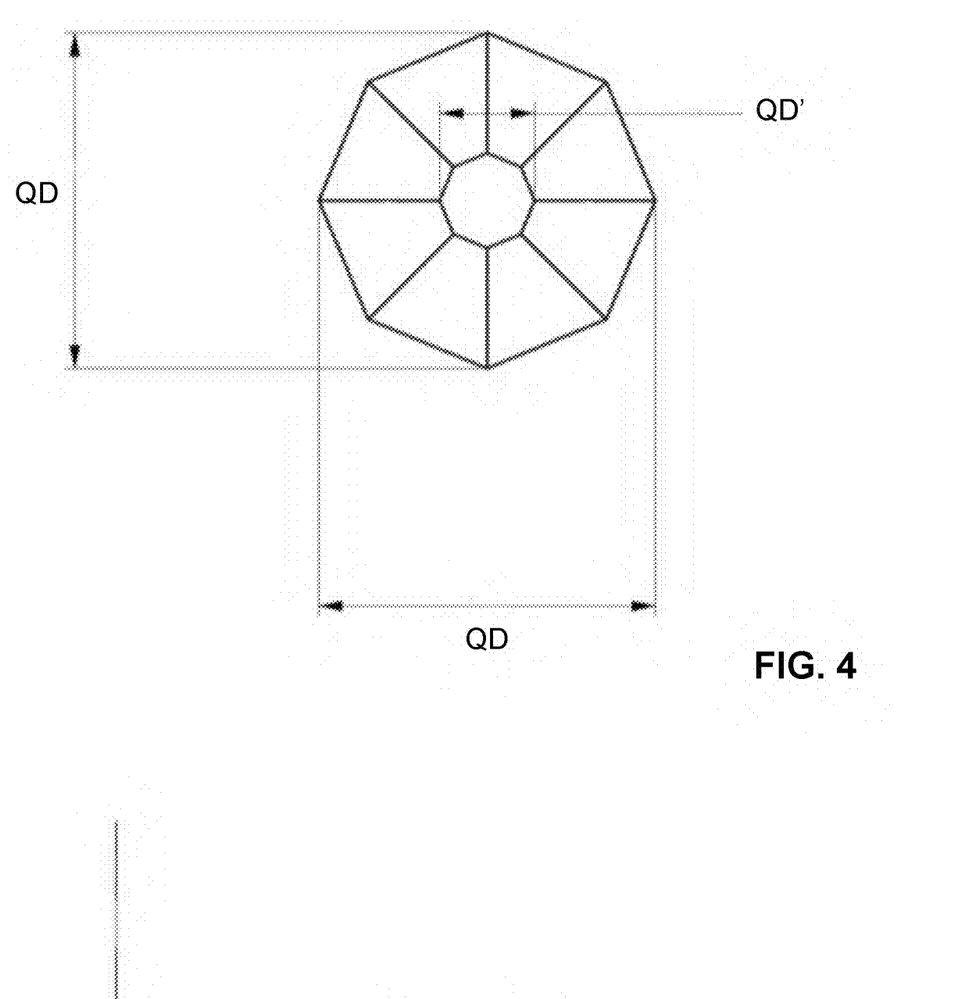
FIG. 4 shows a plan view of a schematically represented diffuser element according to a first embodiment.
Figure 5:
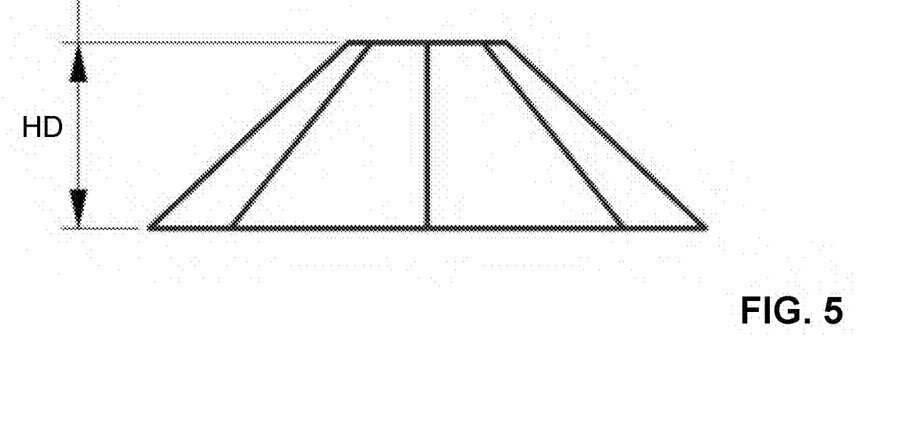
FIG. 5 shows a side view of the diffuser element, according to FIG. 4.

In the exemplary embodiment shown in FIG. 1, the diffuser elements 312, 313, 314, 315 respectively have the shape of a frustopyramid, as is shown in detail in FIGS. 4 and 5, in particular a regular right frustopyramid. The frustopyramid in the present case has an octagon as its base face and, correspondingly, a lateral surface consisting of eight side surfaces. Of course, embodiments of diffuser elements which respectively form a frustopyramid with fewer or more than eight side surfaces are also possible. The side surfaces form the delimiting surfaces of the diffuser elements 312, 313, 314, 315, which cause the light scattering.

The height HD of the diffuser elements 312, 313, 314, 315 is preferably about 2 to 5 micrometers. The maximum diameter QD of the diffuser elements 312, 313, 314, 315 in the region of the base face of the frustopyramid is preferably respectively 50 micrometers, preferably respectively about 10 micrometers, and the maximum diameter QD' in the region of the top face, extending parallel to the base face, of the frustopyramid is preferably about 2.5 to 3.5 micrometers.

Figure 3:
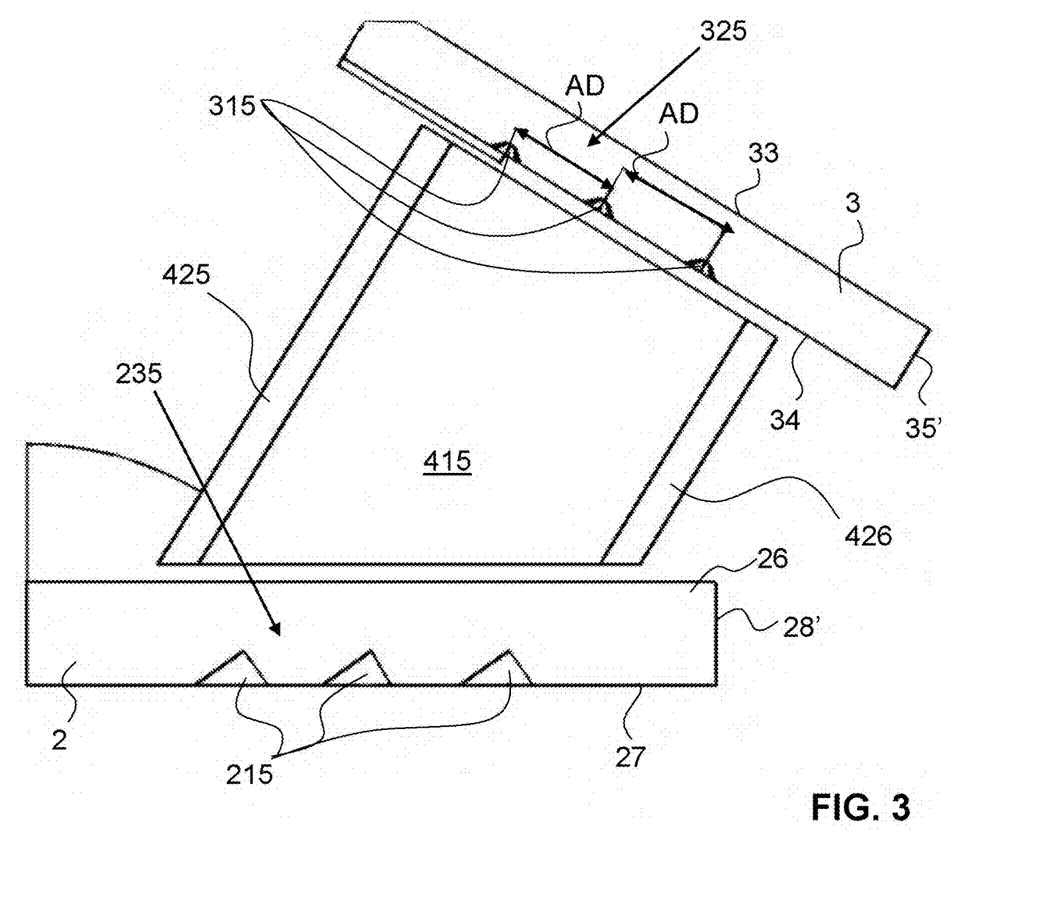
FIG. 3 shows a schematic representation of a detail of the component in region B of FIG. 2 (longitudinal section)

The distances AD, illustrated generically in FIG. 3 for the diffuser elements 315, between the diffuser elements 312, 313, 314, 315 are preferably respectively 30-40 micrometers.

As explained in more detail in connection with FIGS. 6 and 7 generically with the aid of one of the first light deviating elements 211, the first light deviating elements 211, 212, 213, 214, 215 and the second light deviating elements 221, 222 are respectively configured in the form of local elevations and depressions in the surface 26 or lower surface 27 of the first light guide 2. In principle, both the first and the second light deviating elements may be configured arbitrarily as elevations or depressions in the surface 26 or as elevations or depressions in the lower surface 27. The light deviation is in this case caused by the abrupt change in the refractive index at the transition from the material of the first light guide 2 to air, or vice versa, in the region of the first light deviating elements 211, 212, 213, 214, 215 or the second light deviating elements 221, 222. Formation of the first and/or second light deviation elements inside the first light guide 2 is also possible in principle.

Figure 6:
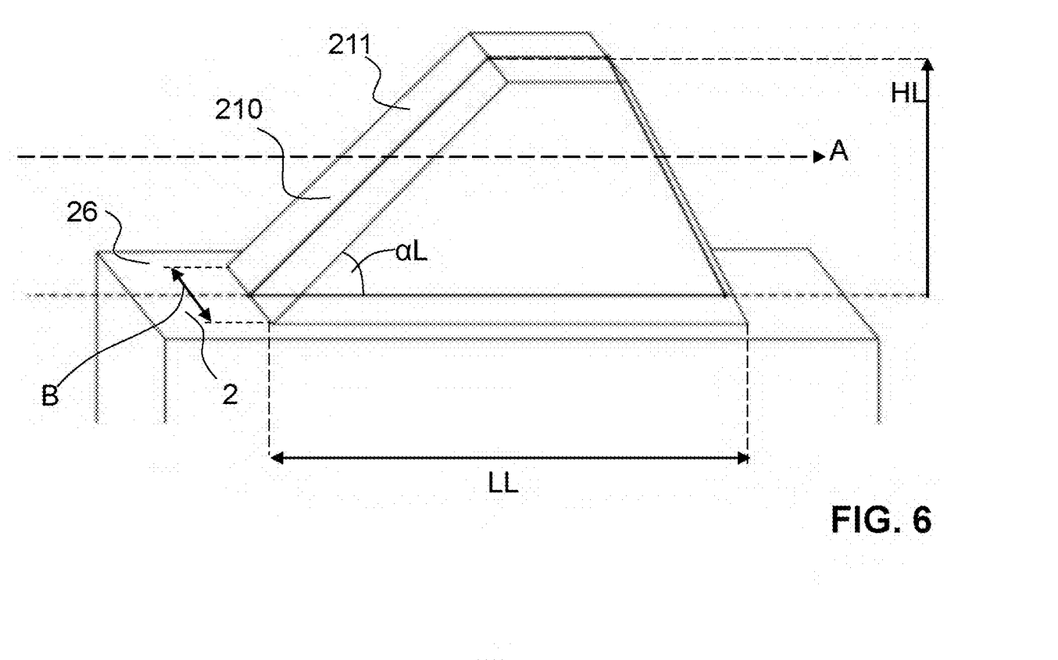
FIG. 6 shows a perspective view of a schematically represented first or second light deviating element according to a first embodiment.
Figure 7:
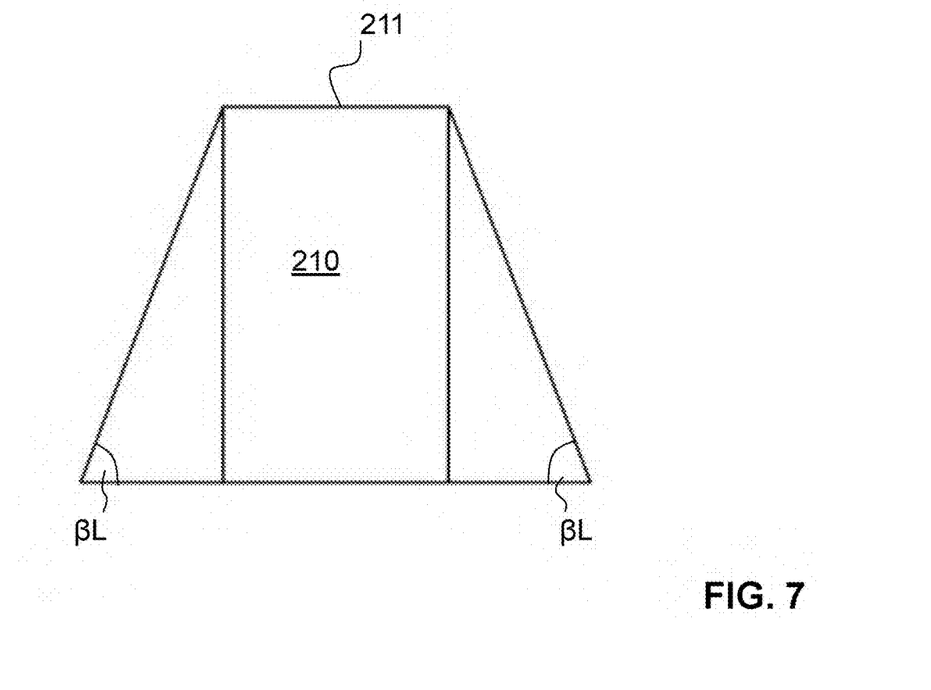
FIG. 7 shows a side view of the first or second light deviating element according to FIG. 6 from a viewing direction along a main propagation direction A.

As can be seen well in FIGS. 6 and 7, the first light deviating elements 211, 212, 213, 214, 215 and the second light deviating elements 221, 222 respectively comprise a planar impingement surface 210, which is inclined by an angle αL with respect to the main propagation direction A of the light introduced from the light source 5 into the first light guide 2. This planar impingement surface 210 is arranged in such a way that the light introduced into the first light guide 2 strikes it directly, that is to say along the main propagation direction A, and is deviated there by a particular deviation angle in the direction of the diffuser elements 311, 312, 313, 314, 315. The deviation angle is in this case determined by the inclination of the planar impingement surface 210 with respect to the direction from which the light strikes the impingement surface 210. In other words, the deviation angle corresponds to the angle of emergence, which is equal to the angle of incidence at which the light strikes the respective impingement surface 210 of a first light deviating element 211, 212, 213, 214, 215, or of a second light deviating element 221, 222.

The height HL of the first light deviating element 211, shown in FIG. 6, in a particularly preferred embodiment is about 10 micrometers, and the length LL measured along the main propagation direction A is about 20 micrometers. The preferred height HL of the first or second light deviating elements 211, 212, 213, 214, 215, 221, 222 is between 5 and 50 micrometers, in particular between 5 and 25 micrometers, and the maximum length LL is preferably at most 50 micrometers. Preferably, the width B of the first or second light deviating elements 211, 212, 213, 214, 215, 221, 222 is between 5 and 150 micrometers, preferably between 5 and 100 micrometers, more preferably between 10 and 50 micrometers, in particular about 25 micrometers. The planar impingement surface 210 is in this case arranged inclined by an angle αL of about 45 degrees with respect to the main propagation direction A and therefore causes deviation of the incident light by about 90°. Preferred inclination angles αL of the planar impingement surface 210 lie in the range of between 20° and 60°. As revealed particularly by FIG. 7, the first light deviating element 211, which as mentioned stands generically for all the first light deviating elements 211, 212, 213, 214, 215 and second light deviating elements 221, 222, comprises side surfaces which adjoin the planar impingement surface 210 and are at an angle βL of about 70 to 90 degrees to the surface 26 (or to the lower surface 27 in the event that the light deviating element is formed as a depression in the lower surface 27). In particular, an angle βL of about 70 to less than 90 degrees offers manufacturing technology advantages during the mold release of the first light guide 2 if it is produced by the injection molding method.

Figure 8:
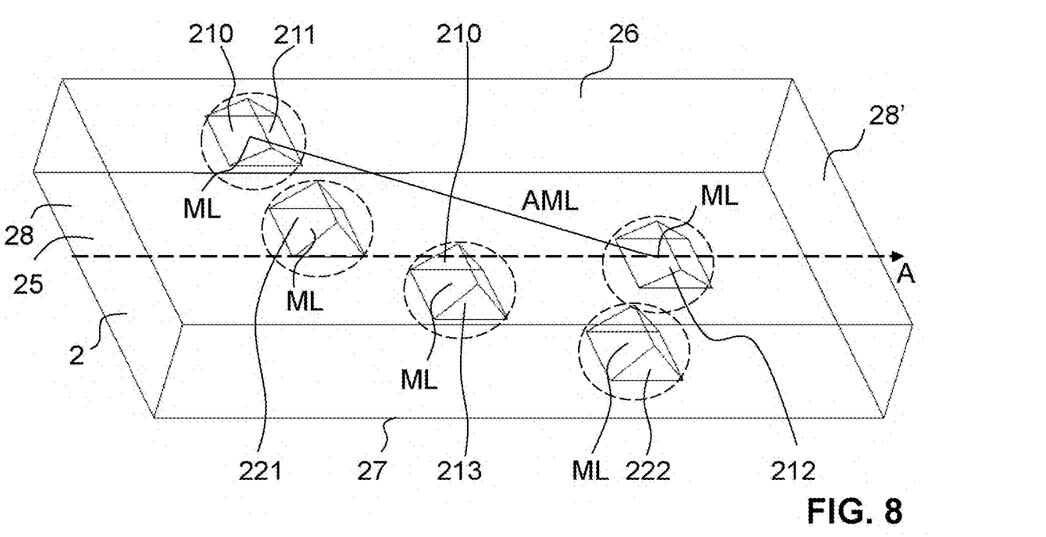
FIG. 8 shows a perspective view of the first light guide, with first and second light deviating elements, of a schematically represented component according to the invention.
Figure 9:
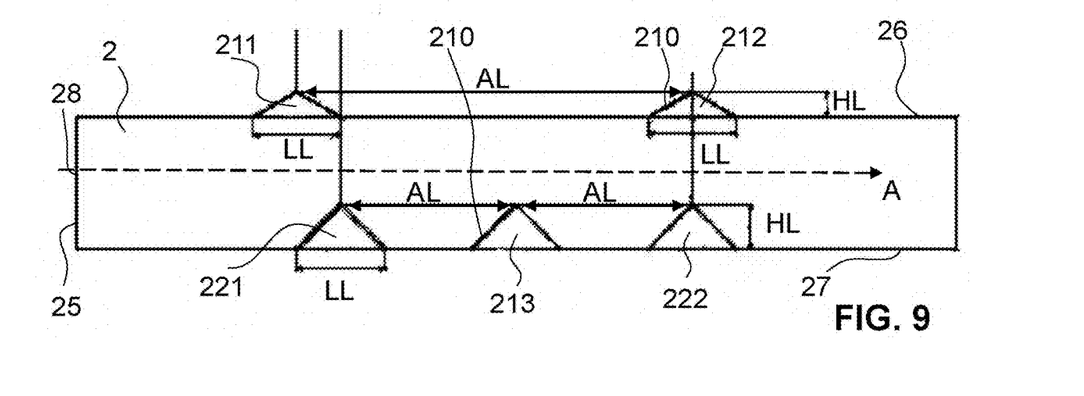
FIG. 9 shows a central longitudinal section through the first light guide according to FIG. 8.

A further possible geometrical configuration of the first light deviating elements 211, 212, 213, 214, 215 and the second light deviating elements 221, 222 is shown in FIGS. 8 and 9. For the first light deviating elements, three first light deviating elements 211, 212, 213 are shown generically in FIGS. 8 and 9, and the two second light deviating elements 221, 222 are shown generically for the second light deviating elements. The first light deviating elements 211 and 212 are respectively configured in the form of elevations in the region of the surface 26 of the first light guide 2. The first light deviating element 213 and the second light deviating elements 221, 222 are respectively configured in the form of depressions in the region of the lower surface 27 of the first light guide 2. The first and second light deviating elements 211, 212, 213 and 221, 222 respectively have the geometrical shape of a prism with two mutually parallel identical triangular surfaces. The side surfaces extending parallel to the surface 26, or the lower surface 27, of the respective prisms respectively have a rectangular shape. In the direction of the main propagation direction A, the first and second light deviating elements 211, 212, 213 and 221, 222 respectively have a length LL of about 20 micrometers. The height HL of the first light deviating elements 211, 212, which are arranged on the surface 26 of the first light guide 2, is respectively about 6 micrometers. The height HL of those light deviating elements 213, 221, 222 which are arranged on the lower surface 27 of the first light guide 2 is respectively about 10 micrometers.

The planar impingement surfaces 210 of the light deviating elements 211, 212, 213 and 221, 222 shown in FIGS. 8 and 9 are respectively configured rectangularly. The planar impingement surfaces 210 of the first light deviating elements 211, 212 arranged on the surface 26 are respectively inclined by about 30 degrees as seen relative to the main propagation direction A. The planar impingement surface 210 of the first and second light deviating elements 213, 221, 222 arranged on the lower surface 27 are respectively inclined by about 45 degrees as seen relative to the main propagation direction A.

While the first light deviating elements 211, 212 arranged on the surface 26 of the first light guide 2 are arranged at a distance AL of about 70 micrometers from one another, the distances AL between the first and second light deviating elements 213, 221, 222 arranged on the lower surface 27 are respectively about 20 micrometers.

It is to be understood that the first and second light deviating elements 211, 212, 213, 214, 215 and 221, 222 and the diffuser elements 311, 312, 313, 314, 315 are not restricted to the geometrical configurations or dimensions and arrangements indicated here. Quite the contrary, with the aid of the examples explained it is intended to be illustrated that these elements may be provided in a multiplicity of configurations, in order to carry out efficient illumination of the component. For example, the first and/or second light deviating elements 211, 212, 213, 214, 215 and 221, 222 may be formed not only on the surface 26, or lower surface 27, of the first light guide 2, but also inside the first light guide 2. The same applies for the diffuser elements 311, 312, 313, 314, 315 of the second light guide 3. Furthermore, the first and second light deviating elements 211, 212, 213, 214, 215 and 221, 222 and the diffuser elements 311, 312, 313, 314, 315 may arbitrarily be configured, for example, pyramidally, frustopyramidally, cuboidally, cubically or as a prism. Particularly in the case of the diffuser elements 311, 312, 313, 314, 315, conical, cylindrical or hemispherical geometries are also possible.

The light source 5 is in this case a light-emitting diode (LED), which is arranged next to the light introduction surface 25 of the first light guide 2 and which shines light laterally and along the main propagation direction A into the first light guide 2. The specification of the main propagation direction A is in this case not intended to imply that all light rays actually propagate in this direction inside the first light guide 2, but rather means that the dominant or main propagation component of all the light rays extends in this direction.

In the exemplary embodiment shown in FIG. 1, all the first and second light deviating elements 211, 212, 213, 214, 215 and 221, 222 are arranged in first light deviating groups 231, 232, 233, 234, 235 and second light deviating groups 241, 242, respectively. The light deviating elements of a common first or second light deviating group 231, 232, 233, 234, 235 or 241, 22 on the one hand are respectively arranged in an identical common region, but on the other hand respectively also have the same or at least a similar configuration. Thus, the light deviating elements 211, 212, 213, 214, 215 and 221, 222 of a common first or second light deviating group 231, 232, 233, 234, 235 or 241, 242 are respectively configured in particular to deviate the light introduced into the first light guide 2 by the same or at least approximately the same deviation angle.

In the exemplary embodiment shown in FIG. 1, a first light deviating group 231 is formed by first light deviating elements 211, which are arranged on the surface 26 of the first light guide 2 in the vicinity of the light introduction surface 25. The first light deviating elements 211 of this first light deviating group 231 respectively comprise a planar impingement surface 210, which has the same inclination in relation to the main propagation direction A. Light which strikes the first light deviating elements 211 of this first light deviating group 231 at a particular angle of incidence is therefore respectively deviated by the same deviation angle.

The same applies for a further first light deviating group 232, which is formed by the first light deviating elements 212 and which is arranged on the surface 26 of the first light guide 2 following the first light deviating group 231 with a somewhat larger distance from the light source 5. The first light deviating elements 212 of the first light deviating group 232 also all have substantially the same configuration and are configured to deviate the light in respectively at least approximately the same direction.

The impingement surfaces 210, responsible for the light deviation, of the first light deviating elements 212 of the first light deviating group 232 are, however, inclined by a slightly different angle relative to the main propagation direction A than the impingement surfaces 210 of the first light deviating elements 211 of the first light deviating group 231. The effect of this is that these two light deviating groups 231 and 232 therefore differ in their deviation angles, and that the deviated light is therefore forwarded in correspondingly slightly different directions.

The first light deviating elements 213, the first light deviating elements 214 and the first light deviating elements 215 on the lower surface 27 of the first light guide 2 also respectively comprise, within their respective light deviating group 233, 234 and 235, impingement surfaces 210 with the same or at least approximately the same inclinations relative to the main propagation direction A. Depending on the light deviating group 233, 234 or 235, however, the light is deviated by the corresponding light deviating elements 213, 214, 215 by different deviation angles and therefore forwarded in different directions.

In a similar way to the first light deviating elements 211, 212, 213, 214, 215, the second light deviating elements 221, 222 are also arranged in groups, which are referred to here as second light deviating groups 241, 242. The second light deviating elements 221, 222 of a common second light deviating group 241, 242 are respectively arranged in the same, common region and furthermore respectively also have the same or at least a similar configuration. In particular, the light is respectively deviated by the same or at least approximately the same deviation angle by second light deviating elements 221, 222 which are arranged inside the same light deviating group 241 or 242.

In the present exemplary embodiment, the impingement surfaces 210 of the second light deviating elements 221 of the second light deviating group 241 and the impingement surfaces 210 of the second light deviating elements 222 of the second light deviating group 242 respectively have the same inclination in relation to the main propagation direction A, so that the light is respectively deviated by the same deviation angle in the two second light deviating groups 241 and 242. It is, however, likewise possible for second light deviating groups which deviate light with different deviation angles to be provided.

As likewise revealed by FIG. 1, all the first light deviating elements 211, 212, 213, 214, 215 of a common first light deviating group 231, 232, 233, 234, 235 are respectively arranged in a common plane which extends parallel to the main propagation direction A of the introduced light in the first light guide 2. Likewise, all the second light deviating elements 221, 222 of a common second light deviating group 241, 242 are respectively arranged in a common plane which extends parallel to the main propagation direction A of the introduced light in the first light guide 2.

In the present example, the second light deviating group 241 is assigned to the first light deviating group 231. This means that the inclination of the impingement surfaces 210 of the second light deviating elements 221 of the second light deviating group 241 and the arrangement of the second light deviating group 241 relative to the first light deviating group 231 are such that the light introduced into the first light guide 2 is directionally deviated in the direction of the first light deviating group 231 by the second light deviating group 241.

In a similar way thereto, the second light deviating group 242 is assigned to the first light deviating group 232. Because of such multiple deviation of the light introduced into the first light guide 2, it is possible to deviate the light of the light source 5 efficiently, and without substantial losses, by very large angles overall, in particular by angles of more than 90°. In the example according to FIG. 1, the introduced light is deviated by about 130 to 140 degrees relative to the main propagation direction A by the interaction of the first light deviating group 231 or 232 and the second light deviating group 241 or 242.

Depending on the dimensioning of the light deviating elements 211, 212 of the first light deviating group 231, 232, the second light deviating elements 221, 222 of the second light deviating groups 241, 242 may be configured in such a way that, although the light is respectively deviated approximately in the same direction inside the respective second light deviating group 241, 242 by the second light deviating elements 221, 222, at the same time a certain focusing or spreading of the light rays is produced, so that the surface covered by the first light deviating group 231 or 232 is just fully illuminated by the deviated light.

In a similar way to the first and second light deviating elements 211, 212, 213, 214, 215 and 221, 222, the diffuser elements 311, 312, 313, 314, 315 in the second light guide 3 are also arranged in a plurality of diffuser element groups 321, 322, 323, 324, 325. Each of the light guide sections 361, 362, 363, 364, 365 respectively comprises one of the diffuser element groups 321, 322, 323, 324, 325.

All the diffuser elements 311, 312, 313, 314, 315 of a common diffuser element group 321, 322, 323, 324, 325 are respectively configured identically. Furthermore, all the diffuser elements 312, 313, 314, 315 of a common diffuser element group 322, 323, 324, 325 are arranged in a common plane, different diffuser element groups 322, 323, 324, 325 forming mutually inclined planes according to the orientation of the respective light guide sections 362, 363, 364, 365.

Each of the diffuser element groups 321, 322, 323, 324, 325 is respectively assigned one of the first light deviating groups 231, 232, 233, 234, 235, so that the light introduced into the first light guide 2 is respectively deviated by each of the first light deviating groups 231, 232, 233, 234, 235 in the direction of one of the diffuser element groups 321, 322, 323, 324, 325. As revealed by FIG. 1, a first diffuser element group 321 having the diffuser elements 311 is assigned the first light deviating group 231, the light which is deviated by the first light deviating elements 211 of this first light deviating group 231 directionally striking the diffuser elements 311. In a similar way thereto, the first light deviating group 232 is assigned to a second diffuser element group 322 having the diffuser elements 312, the first light deviating group 233 is assigned to a third diffuser element group 323 having the diffuser elements 313, the first light deviating group 234 is assigned to a fourth diffuser element group 324 having the diffuser elements 314 and the first light deviating group 235 is assigned to a fifth diffuser element group 325 having the diffuser elements 315.

Provided between the first light guide 2 and the second light guide 3, there is a structure 4, which may also be referred to as a carrier structure. The structure 4 is preferably produced by the injection molding method from a plastic, and in particular is configured in one piece as a whole. The structure 4 is used, on the one hand, for holding the second light guide 3. On the other hand, it comprises channels 411, 412, 413, 414, 415 in order to delimit the light deviated between the first light deviating structures 211, 212, 213, 214, 215 and the diffuser elements 311, 312, 313, 314, 315 in respect of its propagation. The channels 411, 412, 413, 414, 415 in this case extend respectively between one of the first light deviating groups 231, 232, 233, 234, 235 and the correspondingly assigned diffuser element group 321, 322, 323, 324, 325.

The channels 411, 412, 413, 414, 415 are respectively delimited on all sides by structure walls configured to be light-reflecting or light-absorbing, of which the structure walls 421, 422, 423, 424, 425, 426 may be seen in FIG. 1.

In the exemplary embodiment shown in FIG. 1, the structure 4 is arranged at a distance from the first light guide 2. It is, however, also possible for the structure 4, and in particular the structure walls 421, 422, 423, 424, 425, 426, to bear directly on the surface 26 of the first light guide 2. As revealed by FIG. 1, the structure walls 421, 422, 425, 426, and correspondingly the channels 411, 415 delimited by these structure walls, have a certain inclination of about 45° in relation to the surface 26 of the first light guide 2. This inclination is in a direct relationship with the inclination of the corresponding light guide sections 361, 365 of the second light guide 3, or respectively with the deviation angle by which the light is directionally deviated by the first light deviating elements 211, 215 in the direction of the diffuser elements 311, 315.

In order to achieve a sufficient luminous density or illumination on the visible side 11 of the component 1, a number of first and second light deviating elements 211, 212, 213, 214, 215 and 221, 222 and/or diffuser elements 311, 312, 313, 314, 315 which is as high as possible is advantageous. At the same time, however, there is an unesthetic effect if these elements are visible to the human eye in the unilluminated state, i.e. when no light is introduced into the first light guide 2 from the light source 5.

So that maximally efficient light deviation is achieved by means of the first light deviating elements 211, 212, 213, 214, 215, and therefore a high luminance during the illumination, the dimensioning and arrangement of the first light deviating elements 211, 212, 213, 214, 215 are preferably as follows: as revealed generically by FIGS. 8 and 9 with the aid of the first light deviating elements 211, 212, 213, the respective first light deviating elements 211, 212, 213, 214, 215 have a circle as a cross section with a midpoint, or a circumcircle with a midpoint ML can be drawn around the cross section of a respective first light deviating element 211, 212, 213, 214, 215. Furthermore, the midpoint ML of the circle or of the circumcircle of a respective first light deviating element 211, 212, 213, 214, 215 of a respective first light deviating group 231, 232, 233, 234, 235 has a distance AML from the midpoint ML of the circle or of the circumcircle of all other first light deviating elements 211, 212, 213, 214, 215 of the respective first light deviating group 231, 232, 233, 234, 235 which is less than the diameter of the circle or of the circumcircle of the respective first light deviating element 211, 212, 213, 214, 215 divided by the value 0.33.

These geometrical dimensions give a first light guide 2 that has a high density of first light deviating elements 211, 212, 213, 214, 215 and thus ensures efficient illumination of the component 1. Similar dimensions are also preferred for the second light deviating elements 221, 222, so that the light deviation by means of the second light deviating elements 221, 222 is also as efficient as possible.

So that the diffuser elements 311, 312, 313, 314, 315 are invisible to the human eye in the unilluminated state of the component 1, the dimensioning and arrangement of the diffuser elements 311, 312, 313, 314, 315 is preferably as follows: a respective diffuser element 311, 312, 313, 314, 315 has a circle as a cross section with a midpoint, or a circumcircle with a midpoint can be drawn around the cross section of a respective diffuser element 311, 312, 313, 314, 315, the midpoint of the circle or of the circumcircle of a respective diffuser element 311, 312, 313, 314, 315 of a respective diffuser element group 321, 322, 323, 324, 325 having a distance from the midpoint of the circle or of the circumcircle of all other diffuser elements 311, 312, 313, 314, 315 of the respective diffuser element group 321, 322, 323, 324, 325 which is greater than the diameter of the circle or of the circumcircle of the respective diffuser element 311, 312, 313, 314, 315 divided by the value 0.33.

The first as well as the second light guide 2, 3 are preferably produced by means of the so-called LIGA manufacturing method (acronym for Lithographie, Galvanik and Abformung [Lithography, Electroplating and Molding]), in particular by means of so-called gray-scale lithography. As is known to the person skilled in the art, these methods make it possible to produce light guides having microstructures formed on the surface. Above all, gray-scale lithography makes it possible to produce precise, accurately defined structures with exactly predetermined dimensions in the micrometer range, as is required for the production of the first and second light deviating elements 211, 212, 213, 214, 215 and 221, 222 as well as the diffuser elements 311, 312, 313, 314, 315.

In a preferred production of the first light guide 2 or of the second light guide 3, a photoresist is initially applied onto a substrate and then a defined geometrical structure is produced in the photoresist and/or in the substrate by means of gray-scale lithography. A coating, in particular a coating of metal, for example nickel, is then applied by means of electroplating onto the structured photoresist and/or the structured substrate. In this case, the structuring of the photoresist and/or the substrate is transferred onto the coating, so that a coating having a defined structure is formed. In a next step, the coating with the defined structure is separated from the substrate and photoresist and is used as a tool insert in an injection molding tool, in which the first and second light guides 2 and 3 may finally be produced by the injection molding method.

The invention claimed is:

1. A component for a vehicle, having a visible side, comprising:
   a first light guide, which comprises a light introduction surface and a plurality of first light deviating elements, light being introducible into the first light guide through the light introduction surface;
   a plurality of diffuser elements, which are configured to scatter light diffusely;
   a second light guide, which comprises the diffuser elements; and
   a structure, arranged between the first light guide and the second light guide, having at least one channel for delimiting the directionally deviated light between the first light guide and the second light guide, wherein the at least one channel is laterally delimited by structure walls which are configured to be light-absorbing,
   wherein the first light deviating elements are respectively configured to directionally deviate the light introduced into the first light guide by a deviation angle in the direction of the diffuser elements, so that the diffuser elements scatter this directional light diffusely in the direction of the visible side.

2. The component as claimed in claim 1, wherein the first light deviating elements are arranged in one or more first light deviating groups in such a way that the first light deviating elements respectively deviate the light introduced into the first light guide by the same deviation angle inside each of the first light deviating groups.

3. The component as claimed in claim 2, wherein all the first light deviating elements of a common first light deviating group are respectively arranged in a common plane.

4. The component as claimed in claim 3, wherein the common plane extends substantially parallel in relation to a main propagation direction of the introduced light in the first light guide.

5. The component as claimed in claim 2, wherein a plurality of first light deviating groups are provided, and wherein the first light deviating elements of different first light deviating groups directionally deviate the light introduced into the first light guide by a respectively different deviation angle.

6. The component as claimed in claim 1, wherein the diffuser elements are arranged in one or more diffuser element groups.

7. The component as claimed in claim 6, wherein all the diffuser elements of a common diffuser element group are respectively arranged in a common plane.

8. The component as claimed in claim 6, wherein each of the diffuser element groups is respectively assigned one of the first light deviating groups, so that the light introduced into the first light guide is deviated by each of the first light deviating groups respectively in the direction of one of the diffuser element groups.

9. The component as claimed in claim 6, wherein a plurality of diffuser element groups are provided, and all the diffuser elements of a common diffuser element group are respectively arranged in a common plane, and wherein the diffuser elements of different diffuser element groups are respectively arranged in one of mutually inclined planes.

10. The component as claimed in claim 9, wherein the structure has a plurality of channels, with each channel being assigned to one respective diffuser element group, and wherein the channels extend between the first light guide and the second light guide in directions mutually inclined differently according to the planes of the diffuser element groups.

11. The component as claimed in claim 1, wherein the first light guide furthermore comprises a plurality of second light deviating elements, which are respectively configured to directionally deviate the light introduced into the first light guide in the direction of the first light deviating elements.

12. The component as claimed in claim 11, wherein the second light deviating elements are arranged in one or more second light deviating groups in such a way that the second light deviating elements directionally deviate the light introduced into the first light guide respectively by the same deviation angle inside each of the second light deviating groups.

13. The component as claimed in claim 12, wherein all the second light deviating elements of a common second light deviating group are respectively arranged in a common plane.

14. The component as claimed in claim 12, wherein a plurality of second light deviating groups are provided, and wherein the second light deviating elements of different second light deviating groups directionally deviate the light introduced into the first light guide by a respectively different deviation angle.

15. The component as claimed in claim 12, wherein each of the second light deviating groups is respectively assigned one of the first light deviating groups, so that the light introduced into the first light guide is deviated by each of the second light deviating groups respectively in the direction of one of the first light deviating groups.

16. The component as claimed in claim 1, wherein a respective first light deviating element has a circle as a cross section with a midpoint, or a circumcircle with a midpoint can be drawn around the cross section of a respective first light deviating element, and wherein the midpoint of the circle or of the circumcircle of a respective first light deviating element has a distance from the midpoint of the circle or of the circumcircle of all other first light deviating elements, which is less than the diameter of the circle or of the circumcircle of the respective first light deviating element divided by the value 0.33.

17. The component as claimed in claim 1, wherein a respective diffuser element has a circle as a cross section with a midpoint, or a circumcircle with a midpoint can be drawn around the cross section of a respective diffuser element, and wherein the midpoint of the circle or of the circumcircle of a respective diffuser element has a distance from the midpoint of the circle or of the circumcircle of all other diffuser elements, which is greater than the diameter of the circle or of the circumcircle of the respective diffuser element divided by the value 0.33.

18. The component as claimed in claim 1, furthermore comprising at least one light source for introducing the light into the first light guide.

19. The component as claimed in claim 1, wherein the second light guide is arranged at a distance from the first light guide.

20. The component as claimed in claim 1, wherein the second light guide has a curvature or a plurality of segments arranged mutually inclined, and wherein the structure walls extend between the first light guide and the second light guide in directions mutually inclined differently according to this curvature, or according to the extent directions of the segments.

21. The component as claimed in claim 20, wherein the second light guide is configured in several pieces.

22. The component as claimed in claim 20, wherein the second light guide is configured in one piece and as a flexible foil.

23. The component as claimed in claim 1, wherein the visible side is formed at least partially by a decorative element and is configured to be curved overall.

24. The component as claimed in claim 23,
wherein the decorative element comprises openings that enable viewing of the second light guide illuminated via the first light guide, and
wherein the second light guide engages in the openings in each case in such a way that a surface of the second light guide lies flush in the region of the openings with a surface of the decorative element which forms the visible side.

* * * * *